No. 866,164. PATENTED SEPT. 17, 1907.
G. J. SOGGE.
TRANSMISSION GEARING.
APPLICATION FILED MAY 31, 1906.
2 SHEETS—SHEET 1.
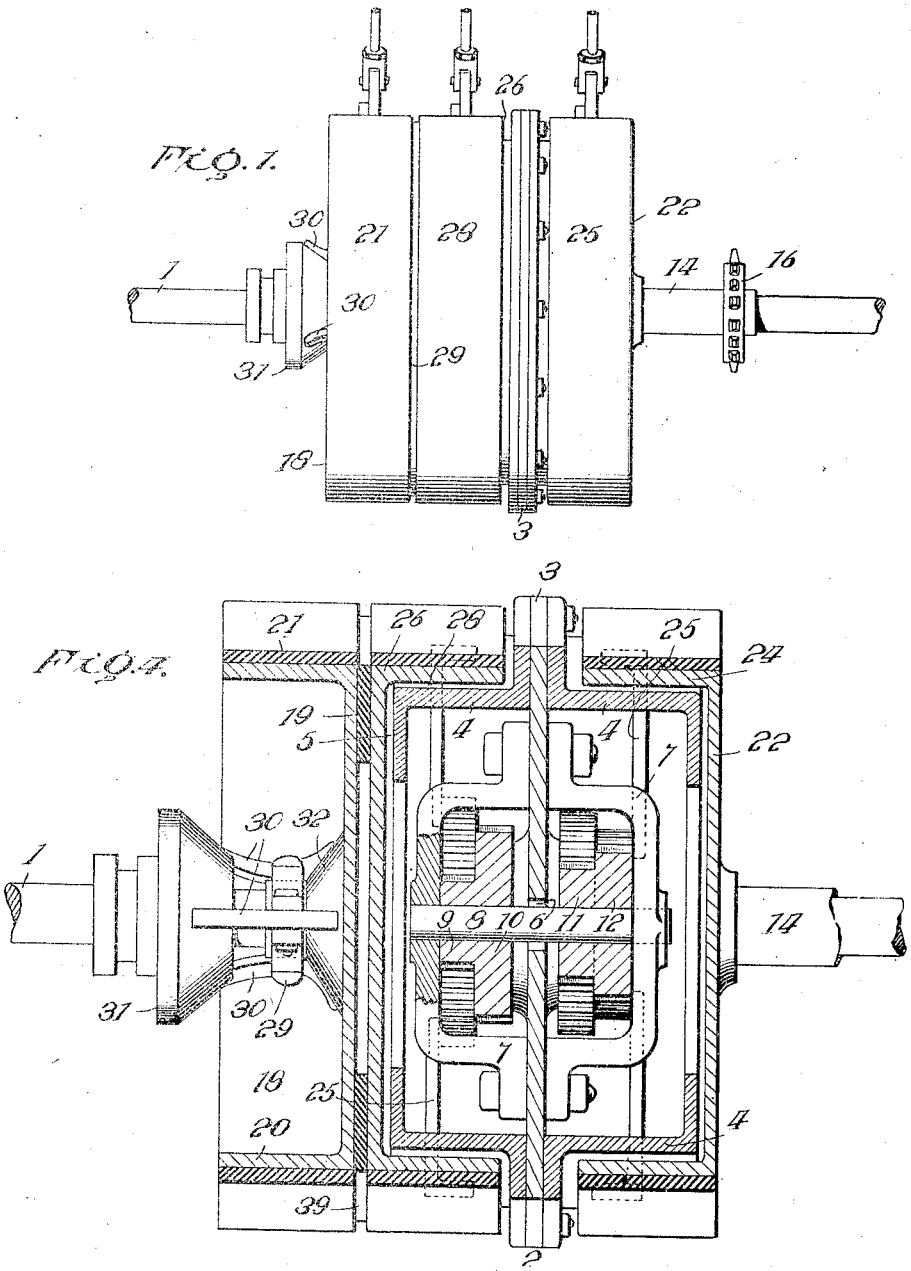

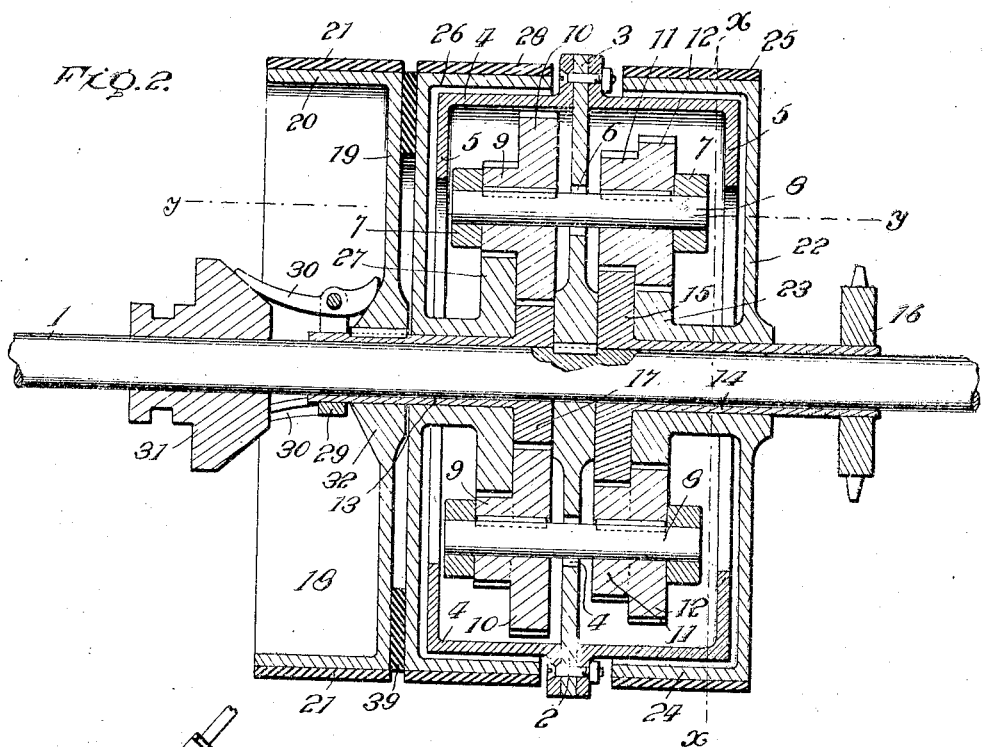
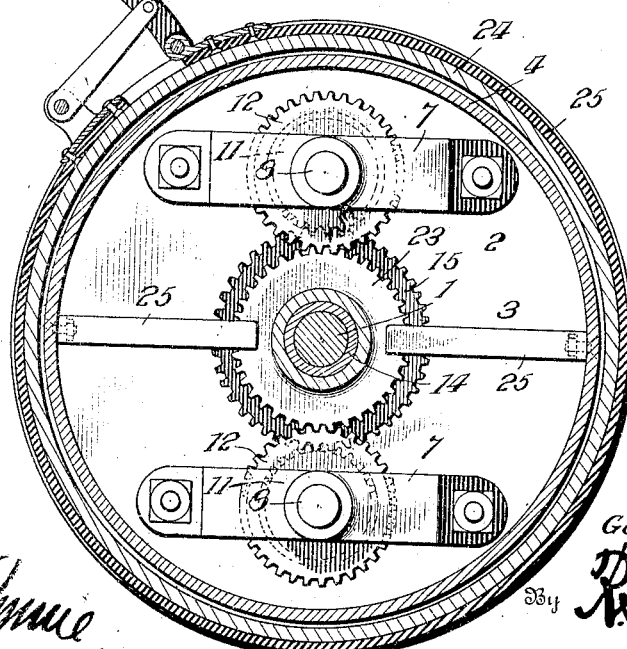

UNITED STATES PATENT OFFICE.

GEORGE J. SOGGE, OF HANSON, SOUTH DAKOTA.

TRANSMISSION-GEARING.

No. 866,164.          Specification of Letters Patent.          Patented Sept. 17, 1907.

Application filed May 31, 1906. Serial No. 319,542.

*To all whom it may concern:*

Be it known that I, GEORGE J. SOGGE, a citizen of the United States, residing at Hanson, in the county of Yankton and State of South Dakota, have invented certain new and useful Improvements in Transmission-Gearings, of which the following is a specification.

The present invention relates to improvements in transmission gearing of that type which is commonly employed in connection with automobiles or like devices in which it is desired to impart motion from a constantly rotating shaft to a driven part, both at variable speeds with relation to the shaft and in a reverse direction to that of the shaft.

The object of the invention is to provide a device which will accomplish this result in a very efficient manner with comparatively little loss by friction, and which is at the same time very compact in its structure.

For a full description of the invention and the merits thereof and also to acquire a knowledge of the details of construction of the means for effecting the result, reference is to be had to the following description and accompanying drawings, in which:

Figure 1 is a side elevation of the transmission gearing; Fig. 2 is a longitudinal sectional view through the same; Fig. 3 is a transverse sectional view on the line $x-x$ of Fig. 2; and, Fig. 4 is a longitudinal sectional view on the line $y-y$ of Fig. 2.

Corresponding and like parts are referred to in the following description and indicated in all the views of the drawings by the same reference characters.

The numeral 1 designates the driving shaft which is connected directly to any suitable source of power and which revolves constantly in the same direction and at the same speed. The case 2 is keyed upon, or otherwise rigidly connected to the shaft 1 in such a manner as to always turn therewith. This case, in the present instance, comprises a central disk 3 which is rigidly connected to the shaft and which is provided at its periphery with annular flanges 4 which project outwardly in opposite directions and have their edges turned inwardly, as seen at 5. Openings 6 are formed in the plate 3 at diametrically opposite points, and a pair of brackets 7 is bolted or otherwise connected to the plate so as to project outwardly on both sides of each of the openings 6. A shaft 8 passes loosely through each of the openings 6 and has its opposite ends journaled in the brackets 7. Four gear wheels 9, 10, 11 and 12 of various sizes are keyed upon each of the shafts 8, two of the gear wheels being placed upon each side of the plate 3, as shown in the drawings.

Sleeves 13 and 14 are loosely mounted upon the driving shaft 1 on opposite sides of the plate 3, the sleeve 14 being provided at its inner end with a gear wheel 15 which meshes with and is somewhat larger than the gear wheels 11, in the present instance about twice as large, although the exact ratio is immaterial. At the outer end of the sleeve 14 is located the sprocket wheel 16 or any other suitable means for transmitting power to the rear axle or part being driven. In a somewhat similar manner, the sleeve 13 is provided at its inner end with the gear wheel 17 which meshes with and is somewhat smaller than the gear wheels 10 upon the shafts 8. A drum 18 is connected to the outer portion of the sleeve 13 so as to revolve with the said sleeve, the said drum comprising a disk 19 having the periphery thereof formed with an outwardly projecting annular flange 20 around which the brake band 21 passes.

A drum 22 having the gear wheel 23 connected thereto is loosely mounted upon the sleeve 14 so that the said gear wheel meshes with and has approximately the same size as the gear wheels 12 upon the shafts 8. The outer edge of this drum 22 extends inwardly at 24 so as to project over one of the flanges 4 upon the disk 3, and at the same time forms a means for engaging with the brake band 25. A second brake drum 26, somewhat similar to the drum 22, is loosely mounted upon the sleeve 13 and is formed with the gear wheel 27 which meshes with and is considerably larger than the gear wheels 9 upon the shafts 8, in the present instance, about three times as large. It will also be observed that the outer edge of the drum 26 projects inwardly over one of the flanges 4 upon the plate 3 and at the same time forms a means for engaging with the brake band 28. A band 39 is interposed between the two drums 18 and 26 so that by forcing the two drums toward each other, they can be locked together so as to rotate simultaneously. In order to provide means for forcing the drum 18 toward the drum 26, a collar 29 is secured to the projecting end of the sleeve 13 and a series of curved levers 30 pivotally mounted upon the said collar. The outer end of each of the levers 30 engages with a conical member 31 slidably mounted upon the driving shaft 1, while the opposite end of each of the curved levers engages with the inclined wall of an annular projection 32 upon the plate 19. With this construction, it will be apparent that when the conical member 31 is forced inwardly, as can be readily accomplished, in any suitable manner as by a lever, the curved levers 30 will act to force the drum 18 toward the drum 26 and the two drums will be locked together.

By the proper manipulation of the parts described, it is possible to secure 3 forward speeds and a reverse. When the brake band 25 is tightened so as to hold the drum 22 in a fixed position, the gear wheels 12 will revolve about the gear wheel 23 as the case 2 turns with the drive shaft 1 and in the present instance, the shafts 8 will make one turn in the same direction for every turn of the drive shaft 1, since the gear wheels 12 and 23 are of approximately the same size. These shafts 8 will transmit motion through the gear wheels 11 and 15 to the sleeve 14 and will tend to cause the same to revolve in a reverse direction to that of the driving shaft 1. Owing to the fact, however, that the gear wheels 11 are smaller than the gear wheel 15 and in the present instance about one-half as large, it will be apparent that the sleev 14 will only make one backward turn for every two forward turns of the driving shaft and the resultant motion will be a slow-speed forward motion.

When the brake band 21 is tightened and the drum 18 held in a fixed position, the gear wheels 10 will turn about the gear wheel 17 as the case 2 revolves with the driving shaft 1, but, owing to the fact that the gear wheel 17 is smaller than the gear wheels 10, the shafts 8 will revolve slower than the driving shaft 1, and as a result, the backward movement imparted to the sleeve 14 through the gear wheels 11 and 15 will be slower than in the previous instance and an intermediate forward speed will be obtained.

In order to reverse the motion, the band 28 is tightened and the drum 26 brought to a standstill. The gear wheels 9 will then turn about the gear wheel 27, and, owing to the fact that the former are considerably smaller than the latter, the shafts 8 will revolve faster than the driving shaft 1. In the present instance, it will make three revolutions to every one of the driving shaft, since the gear wheel 27 is three times the size of the gear wheels 9. With this condition, it will be apparent that the sleeve 14 will turn backward one and one-half revolutions for every forward turn of the driving shaft 1, owing to the fact that the gear wheel 15 is twice the size of the gear wheels 11. The resultant motion in this case will be a reverse speed equal to one-half the forward speed of the driving shaft, although the exact proportions could be varied by changing the relation of the various gear wheels.

For the direct drive or greatest speed obtainable, the conical member 31 is moved inwardly so as to lock the two drums 18 and 26 together. All of the gear wheels are then prevented from turning and the entire device turns about the shaft 1 and the result is a forward speed equal to that of the shaft.

In order to prevent the drums 26 and 22 from slipping away from the case 2, arms 25 are secured to the latter and project inwardly so as to engage with the gear wheels 27 and 23.

Having thus described the invention, what is claimed as new is:

1. In a transmission gearing, the combination of a shaft, a case rigid with the shaft, a series of gear wheels loosely mounted upon the case, a driven member having an operative connection with one of the gear wheels, a brake drum having an operative connection with one of the gear wheels, a second brake drum having an operative connection with one of the gear wheels, means for moving one of the brake drums into engagement with the opposite brake drum whereby the two are locked together, and means for locking the brake drums in a fixed position.

2. In a transmission gearing, the combination of a shaft, a case rigid with the shaft, a series of gear wheels loosely mounted upon the case, a driven member having an operative connection with one of the gear wheels, a brake drum having an operative connection with another one of the gear wheels, a second brake drum having an operative connection with one of the gear wheels, a friction band interposed between the brake drums, means for moving the brake drums into engagement with each other whereby they are locked together, and means for locking the brake drums in a fixed position.

3. In a transmission gearing, the combination of a shaft, a case rigid with the shaft, a series of gear wheels loosely mounted upon the case, a driven member having an operative connection with one of the gear wheels, a brake drum having an operative connection with one of the gear wheels, a sleeve mounted upon the shaft and having an operative connection with one of the gear wheels, a brake drum slidable upon the sleeve, means for moving the second mentioned brake drum into engagement with the first mentioned brake drum whereby the two are locked together, and means for locking the brake drums in a fixed position.

4. In a transmission gearing, the combination of a shaft, a case rigid with the shaft, a series of gear wheels loosely mounted upon the case, a driven member having an operative connection with one of the gear wheels, a brake drum having an operative connection with another one of the gear wheels, a sleeve loosely mounted upon the shaft and having an operative connection with one of the gear wheels, a brake drum slidable upon the sleeve, a lever mounted upon the sleeve, means for operating the lever to move the two brake drums into engagement with each other, and means for locking the brake drums in a fixed position.

5. In a transmission gearing, the combination of a shaft, a case rigid with the shaft, a series of gear wheels loosely mounted upon the case, a driven member having an operative connection with one of the gear wheels, a brake drum having an operative connection with another one of the gear wheels, a sleeve loosely mounted upon the shaft and having an operative connection with one of the gear wheels, a brake drum slidable upon the sleeve, a lever mounted upon the sleeve, a member slidable upon the shaft and engaging the lever to move the two brake drums into engagement with each other, and means for locking the brake drums in a fixed position.

6. In a transmission gearing, the combination of a shaft, a case rigid with the shaft, a series of gear wheels loosely mounted upon the case, a driven member having an operative connection with one of the gear wheels, a sleeve loosely mounted upon the shaft and having an operative connection with another one of the gear wheels, a brake drum rotatably mounted upon the sleeve and having an operative connection with one of the gear wheels, a second brake drum slidably mounted upon the sleeve and designed to be moved into engagement with the first mentioned brake drum, and means for locking the brake drums in a fixed position.

7. In a transmission gearing, the combination of a shaft, a case rigid with the shaft, a series of gear wheels loosely mounted upon the case, a driven sleeve rotatably mounted upon the shaft on one side of the case and having an operative connection with one of the gear wheels, a brake drum rotatably mounted upon the driven sleeve and having an operative connection with another one of the gear wheels, a sleeve rotatably mounted upon the shaft on the opposite side of the case and having an operative connection with one of the gear wheels, a second brake drum rotatably mounted upon the sleeve and having an operative connection with one of the gear wheels, a third brake drum carried by the sleeve and designed to be locked with the second mentioned brake drum, and means for locking the brake drums in a fixed position.

8. In a transmission gearing, the combination of a shaft, a case rigid with the shaft, a second shaft carried by the case, a series of gear wheels mounted upon the second shaft, a driving sleeve rotatably mounted upon the shaft on one side of the case and having an operative connection with one of the gear wheels, a brake drum rotatably mounted upon the driving sleeve and having an operative connection with one of the gear wheels, a sleeve rotatably mounted upon the shaft on the opposite side of the case and having an operative connection with one of the gear wheels, a second brake drum rotatably mounted upon the sleeve and having an operative connection with one of the gear wheels, a third brake drum slidable upon the sleeve, means for moving the last mentioned brake drum into engagement with the first mentioned brake drum, and means for locking the brake drums in a fixed position.

9. In a transmission gearing, the combination of a shaft, a case rigid therewith and comprising a disk having annular flanges projecting in opposite directions from the periphery thereof, brackets carried by the disk, a second shaft journaled in the brackets, gear wheels mounted upon the second shaft, a driven member having an operative connection with one of the gear wheels, a brake drum upon one side of the case, the said brake drum having an operative connection with one of the gear wheels and being formed with a peripheral flange extending over the corresponding annular flange upon the case, a second brake drum upon the opposite side of the case, the second mentioned brake drum also having an operative connection with one of the gear wheels and being formed with a peripheral flange extending over the corresponding annular flange upon the case, a third brake drum having an operative connection with one of the gear wheels and designed to be moved longitudinally of the shaft so as to be locked to the second mentioned brake drum, and means for locking the brake drums in a fixed position.

10. In a transmission gearing, the combination of a shaft, a case mounted upon the shaft and comprising a disk having annular flanges projecting in opposite directions from the periphery thereof, brackets located upon opposite sides of the disk, a second shaft journaled in the brackets and passing through the disk, a pair of gear wheels rigidly mounted upon the shaft on each side of the disk, a driven sleeve rotatably mounted upon the first mentioned shaft on one side of the case and having an operative connection with one of the gear wheels, a brake drum rotatably mounted on the driven sleeve and having an operative connection with one of the gear wheels, the said brake drum being provided with a peripheral flange extending over the corresponding annular flange upon the case, a sleeve rotatably mounted upon the main shaft on the opposite side of the case and having an operative connection with one of the gear wheels, a second brake drum rotatably mounted upon the sleeve and having an operative connection with one of the gear wheels, the second mentioned brake drum being formed with a peripheral flange extending over the corresponding annular flange of the case, a third brake drum slidable upon the sleeve and designed to be moved into engagement with the second mentioned brake drum, and means for locking the brake drums in a fixed position.

In testimony whereof I affix my signature in presence of two witnesses.

GEORGE J. SOGGE. [L. S.]

Witnesses:
C. W. CHRISTENSEN,
GEORGE NELSON.